United States Patent [19]

Miller

[11] Patent Number: 4,886,085
[45] Date of Patent: Dec. 12, 1989

[54] VACUUM CHECK VALVE AND METHOD OF CONTROL

[75] Inventor: James W. Miller, Xenia, Ohio

[73] Assignee: General Motors Corporation, Detroit, Mich.

[21] Appl. No.: 277,628

[22] Filed: Nov. 30, 1988

[51] Int. Cl.⁴ ............................................. F16K 15/06
[52] U.S. Cl. ....................................... 137/1; 137/514; 137/526; 137/533.25; 137/542
[58] Field of Search .................. 137/1, 514, 526, 542, 137/543, 533.25

[56] References Cited

U.S. PATENT DOCUMENTS 2,293,799   8/1942   Briscoe .............................. 137/542

Primary Examiner—Robert G. Nilson
Attorney, Agent, or Firm—Ernest E. Helms

[57] ABSTRACT

A value opening air flow control ring requires the poppet to travel a controlled distance off the poppet seat to obtain substantially unrestricted air flow, the restricted flow occurring during air flow pulsations which acts to inhibit valve pulsations and resulting valve noises generated by pulsations from the vacuum source. The control ring also causes directional air flow past the poppet, particularly in the early part of the valve opening sequence while the restricted flow is occurring, causing a side bias on the poppet which decreases as the poppet moves toward its fully open position, the side bias being substantially eliminated by the time the poppet reaches its fully open position. The side bias action is reversed in the valve closing movement from the fully open position. The side bias further inhibits valve pulsations which might otherwise occur as the valve tends to move from the closed position to the open position and vice versa in response to vacuum source air flow pulsations.

7 Claims, 1 Drawing Sheet

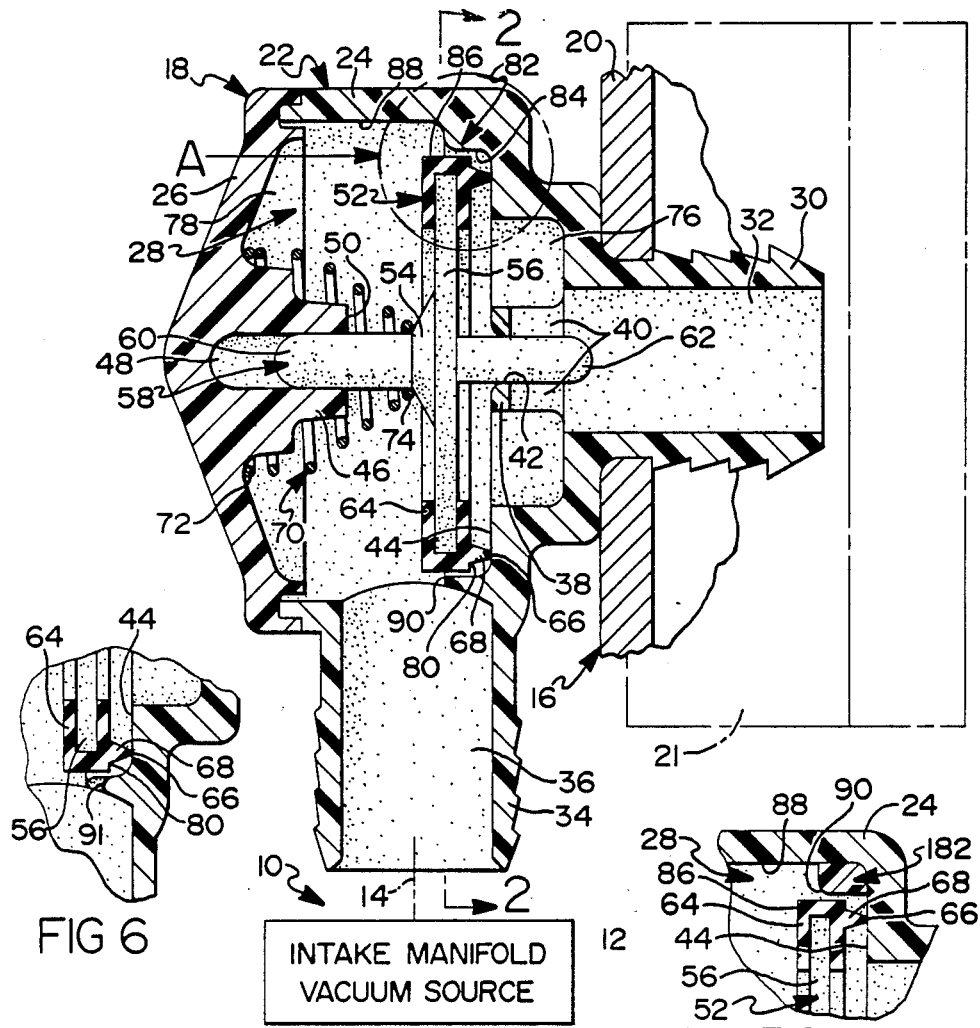
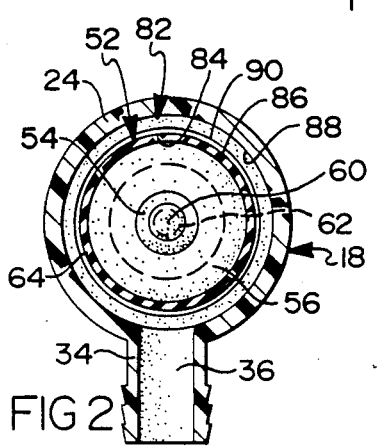
FIG 6
INTAKE MANIFOLD
VACUUM SOURCE
FIG 1
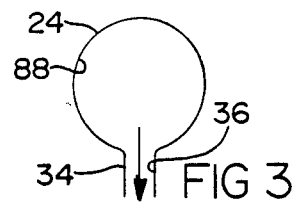
FIG 1a
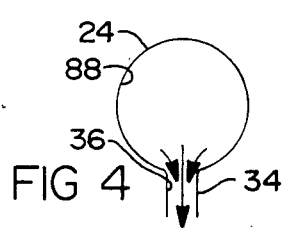
FIG 2
FIG 3
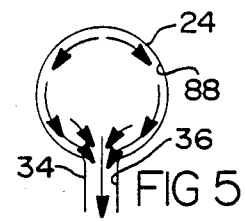
FIG 4  FIG 5

VACUUM CHECK VALVE AND METHOD OF CONTROL

CROSS REFERENCES TO RELATED PATENTS AND APPLICATIONS

The invention is an improvement on the vacuum check valve of U.S. Pat. No. 4,628,959 entitled "Vacuum Check Valve", filed Aug. 30, 1985, issued Dec. 16, 1986 and assigned to the common assignee. It also relates to the inventions disclosed and claimed in U.S. Pat. No. 4,724,867, entitled "Vacuum Check Valve" issued Feb. 16, 1988; U.S. Pat. No. 4,763,689, entitled "Vacuum Check Valve" issued Aug. 16, 1988 and U.S. patent application Ser. No. 277,629 pending, entitled "Vacuum Check Valve" and filed on even date herewith, all of which are also assigned to the common assignee.

FIELD OF THE INVENTION

The invention relates to a vacuum check valve and more particularly to such a valve used in the vacuum supply line as a control for a vacuum suspended brake booster supply. The valve assembly embodying the invention herein disclosed and claimed inhibits pulsation of the valve member as the vacuum pressures change due to air flow pulsations occurring in the vacuum source, particularly when that source is the intake manifold of an internal combustion engine. When valve pulsations are inhibited, the generation of undesirable valve noises is also inhibited.

DESCRIPTION OF RELATED ART

Vacuum check valves of the type disclosed in U.S. Pat. No. 3,086,544, entitled "Check Valve" and issued Apr. 23, 1963, have been used with vacuum suspended power brake boosters for many years. The typical valve construction of this type has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This minor misalignment presented no problem with small leaks that occasionally occurred when used with larger engines. However, as vehicle engines have been made smaller to achieve a higher fuel economy, less vacuum is available to operate various vehicle accessories than was the case with most vehicle engines when such check valves began to be used.

The improved vacuum check valve of U.S. Pat. No. 4,628,959 into which the invention is preferably incorporated as described and claimed herein is a guided poppet valve having a valve stem extending through valve housing guide means. The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat, assuring full circumferential seation and sealing. This type of valve has now been accepted and is in production use with a large portion of the vacuum boosters made in the U.S. of America.

In the vacuum check valve of U.S. Pat. No. 4,763,689 noted above, the valve member is laterally biased by a resilient O-ring type spring element to cause a slight drag force to be exerted on the valve member which is sufficient to inhibit valve member pulsations while permitting proper valve operation. Other arrangements for inhibiting valve member pulsations by various side-loading means are disclosed in U.S. Pat. No. 4,724,867, also noted above.

SUMMARY OF THE INVENTION

The vacuum check valve and method of control herein disclosed and claimed is concerned with controlling the air flow about the valve disc and seal member forming the valve or poppet as that member moves toward and away from the valve seat so that response of the poppet to engine air flow pulsations, which under some conditions would otherwise excite the poppet and result in a vibration and noise problem, can be eliminated.

The improvement herein disclosed and claimed employs a valve opening air flow control ring that requires the poppet to travel a controlled distance from the valve seat in the valve opening direction in response to vacuum source air flow pulsations before it will lift out of the well formed by the control ring. The additional travel eliminates the ability of the poppet to pulse at engine frequency in the almost closed position. Further, a directional air flow vent in the valve opening air flow control ring can be employed to provide side loading of the poppet for frictional damping benefits, eliminating poppet rattle on the seat or through the poppet guide stem. The vent may be oriented toward the exhaust port or any other direction that provides optimum side loading of the poppet.

In the Drawing:

FIG. 1 is a sectional view of a preferred embodiment valve of the present invention;

FIG. 1a is a fragmentary cross-section view taken in the area of circle A of FIG. 1 showing the provision of, a separate air flow control ring;

FIG. 1b is a fragmentary cross section view taken in the area of circle "b" of FIG. 1 showing the provision of an alternative embodiment air flow control ring to that shown in FIGS. 1 and 1a;

FIG. 2 is a view taken along line 2—2 of FIG. 1;

FIGS. 3, 4 and 5 schematically illustrate the air flow paths as the poppet progressively moves from the normal closed position of FIG. 1 to the fully open position.

DESCRIPTION OF THE PREFERRED EMBODIMENTS

The system 10 shown in FIG. 1 includes a vacuum source 12 which is preferably an engine intake manifold.

As is well known, the intake manifold of an internal combustion engine is commonly used as a source of vacuum to supply vacuum pressure to certain accessories, particularly in motor vehicles. A suitable connection 14 is provided to tap into the intake manifold and obtain vacuum therefrom.

A vacuum suspended brake booster servomotor 16 may be the device with which a check valve embodying the invention is used, as more fully disclosed in the above noted patents. The servomotor has a vacuum check valve assembly 18 embodying the invention herein disclosed and claimed. Valve assembly 18 is preferably mounted on the servomotor housing front section 20 and is schematically illustrated in FIG. 1 as opening at the valve inlet side into the servomotor vacuum chamber 21. The outlet side of the vacuum check valve assembly 18 is connected by the vacuum connection 14 to the intake manifold vacuum source 12.

An example of a typical servomotor, with a more detailed description of its operation, is found in U.S. Pat. No. 3,249,021, issued May 3, 1966 and entitled "Power Brake Booster".

The vacuum check valve assembly 18 of FIG. 1 is a modification of the assembly disclosed and claimed in U.S. Pat. No. 4,628,959 noted above. A detailed description of the valve assembly 18 follows so that the improvements to that valve asembly which are herein disclosed and claimed may be fully understood.

Valve assembly 18 includes a housing 22 formed of housing sections 24 and 26. Housing section 26 is sealingly secured to housing section 24 somewhat like a cover and cooperates with housing section 24 to define a valve chamber 28. An inlet 30 is integrally formed with housing section 24. The inlet is constructed to also provide means to secure the valve assembly to the booster housing front section 20 through a booster housing front section opening in sealing relation, as is well known in the art. It also has an inlet passage 32 formed therethrough.

An outlet 34 is also formed as a part of housing section 24. It has an outlet passage 36 formed therethrough and is arranged to receive vacuum connection 14 in sealing relation to provide communication between the valve outlet 34 and the vacuum source 12. The inlet and outlet passages 32 and 36 each connect with the valve chamber 28.

Housing section 24 also has a web 38 formed therein over the inlet passage 32, the web being provided with web openings 40 which provide a substantially unrestricted fluid flow connection from the inlet passage 32 into the valve chamber 28. Web 38 has a center part which is in axial alignment with the inlet passage 32. An opening 42 is formed axially through the web center part so that the web center part forms a guide for the valve member to be described.

An annular valve seat 44 is defined by a surface formed as a part of housing section 24 and generally defining an end wall of the valve chamber 28 together with web 38. The surface of web center part facing toward the main portion of the valve chamber 28 may be a planar extension of the surface defining the annular valve seat 44.

Valve housing section 26 is provided with a boss 46 extending into the valve chamber 28. Boss 46 has a recessed opening 48 formed therein and opening into the valve chamber 28. Opening 48 is in axially spaced alignment with the web opening 42. Boss 46 has a spring seat formed around its base and providing a spring seat for the valve spring to be described, as is more fully shown in the patents and patent applications noted above. The end 50 of boss 46 terminates in spaced relation to the web center part which has opening 42 formed therein. Recessed opening 48 also acts as a guide for a portion of the valve member to be described.

The check valve member 52 of FIG. 1 is a poppet type of check valve contained within the valve chamber 28. Valve member 52 has a rigid valve member body 54 formed to include a disc-like center section 56 and a valve stem 58. Valve stem 58 includes a first valve stem portion 60 extending axially from one side of the center section 56 and forming first guided valve portion which is reciprocably received and guided by recessed opening 48 of housing section 26. The valve stem also includes a second valve stem portion 62 extending axially from the other side of the valve member center section 56 and forming a second guided valve portion. Valve stem portion 62 extends through the web opening 42 for guided reciprocal movement therein. One of the valve stem portions is larger in diameter than the other, and the same is true of the openings 42 and 48, thereby preventing the valve member 52 from being accidentally assembled in the axially reversed position from that desired. For this purpose it is preferred that the valve stem portion 62 and web opening 42 have a smaller diameter than that of the valve stem portion 60 and the recessed opening 48. Since the usual manner of assembly of the valve in the housing would be to first insert stem portion 62 through web opening 42, it is clear that the larger valve stem portion 60 could not be so inserted because web opening 42 is smaller in diameter than that valve stem portion. This effectively prevents misassembly of the valve member in the housing.

Valve member 52 has an annular valve member seal 64 secured to the peripheral portion of the disc-like center section 56 of the valve body 54 and extending radially therebeyond. One side of the annular valve member seal 64 has a valve seat-engageable surface 66 defined by the outer end of a circumferentially formed valve member bead 68 which extends axially from the main part of the valve member seal 64 so as to be engageable with the annular valve seat 44 of housing section 56. A compression coil valve spring 70 is received in valve chamber 28. It has one spring end 72 engaging the above described spring seat formed as a part of housing section 26. The other spring end 74 engages one side of the valve member body 54 so that the valve member 52 is continually urged toward surface sealing engagement with the annular valve seat 44. Valve spring 70 is so proportioned, and the axial distance between the end 50 of boss 46 relative to the facing surface of the valve member body 54 is such, that the valve member body may move against the force of the spring 70 to fully open the valve by separating the valve member bead 68 from the annular valve seat 44 a sufficient axial distance to provide substantially no flow restriction past the bead, the valve seat and the air flow control ring to be described. At the same time, valve stem portion 62 remains guided within the web opening 42 and valve stem portion 60 moves further into the recessed opening 48. The rigid valve member body 54 extends radially outward so that it is axially aligned with the major portion of the valve member bead 68 to provide reinforcement for the entire valve member seal 64 and axial stability for the valve member bead 68. The guiding actions of openings 42 and 48 on stem portions 62 and 60, respectively, further assure the maintenance of the sealing surface 66 of the valve member seal 64 in parallel planar relation with the valve seat 44 at all times.

When the valve member bead 68 is in sealing engagement with seat 44 as shown in FIG. 1, the valve chamber 28 is separated into a chamber inlet section 76 and a chamber outlet section 78. Chamber inlet section 76 is in fluid communication with the inlet passage 32 so that the entire surface area of the valve member 52 positioned radially inward of the seat engageable surface 66 is exposed to pressure within inlet passage 32 and therefore to the pressure in the vacuum chamber 21 of the booster 26. The chamber outlet section 78 is in full fluid communication with the outlet passage 36 at all times, and the pressure therein is the pressure being transmitted to the check valve assembly 16 from the engine vacuum source 12 through vacuum connection 24. This pressure also acts on the valve member 52 across the same effective surface as that described immediately above for the inlet pressure. It also acts on the small annular seal-engaging seat surface area 80 which is defined by the seat area throughout which valve member seal bead surface 66 is in surface engagement with the annular valve seat 44 when the valve is in the closed position. Therefore the pressure acting on valve member 52 and contained within chamber outlet section 78 acts over a slightly larger effective area than does the inlet pressure acting in the chamber inlet section 76 on the effective area of valve member 52. This difference in effective areas is maintained at a minimal amount by keeping the area of surface 80 to a minimal amount. Therefore the valve will remain closed so long as the absolute pressure acting in chamber 78 is greater than, or substantially equal to, the absolute pressure acting in chamber 76. Because the spring force exerted by spring 70 is light, the valve will be moved axially to its open position when the absolute pressure in chamber 76 only slightly exceeds the absolute pressure in chamber 78. The minimal contact area is also important in preventing the valve from sticking during extremely cold conditions, as will be further described.

The valve member seal 64 is preferably molded in place on the valve member body. It has been found that it is also preferable to make the valve member seals from a fluoro-silicone rubber for improved fuel vapor resistance and minimization of cold weather sticking. The material should have a durometer of about 40 to 50 at a standard temperature of 70° F., and should increase in durometer with a decrease in ambient temperature to no more than about 60 to 70 durometer at about minus 10° F. This will not only substantially eliminate cold weather sticking of the valve seal to the valve seat under cold weather conditions, but will also maintain good sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted when the valve is fully open so to minimize flow restriction in that area. It is preferred that the annular area defined by the outer periphery of the valve member and the portion of the valve housing which is radially outward of the valve member outer periphery when the valve is fully open be at least as great as the effective cross-section area of the inlet port formed by inlet 62. This assures a substantially unrestricted air flow past the outer periphery of the valve member when the valve assembly is fully open. A considerably greater air flow may be obtained through the valve than has heretofore been the case. This therefore leads to an increase in the size of vacuum hose such as the hose providing the vacuum connection 24, as well as the sizes of the inlet passage 32 and the outlet passage 36, to take full advantage of the decrease in restriction to flow in the valve itself. This has resulted in substantially less pressure drop in relation to flow rate, minimizing the amount of time required to reestablish the desired vacuum pressure in the vacuum chamber of the brake booster during or after booster operation. At the same time, the average differential pressure for opening the vacuum check valve is maintained at less than one inch of mercury. Where the average flow restriction at a flow rate of 500 cubic feet per hour of air through the valve has previously been in the range of about 18 to 28 inches of mercury, the valve shown in the Figure has an average flow restriction at this flow rate of less than 3 inches of mercury.

The valve has also minimized the amount of leakage when the valve is supposed to be fully closed. Valves like those disclosed in U.S. Pat. No. 4,628,959 (noted above) have been equal to the best of valves in current production at moderately high temperatures. For example, at 212° F., tests have indicated that no leakage has occurred, while on some production units using other valve designs, as much as 10% of the valves will have some leakage at this temperature.

The type of valve shown in the drawing has also considerably decreased the valve leakage at cold temperatures, as well as valve sticking under cold temperatures. For example, valves of the type illustrated in FIG. 1, including valves like those disclosed in U.S. Pat. No. 4,628,959, had no leaks and did not stick at 0° F. The valve also showed dramatic improvement in leakage and potential failure with a pressure differential thereacross as small as 2 inches of mercury and up to 20 inches of mercury, in comparison to various valves used by different manufacturers.

It has been found that in some installations the valve of U.S. Pat. No. 4,628,959, referred to above, would pulsate and generate disagreeable valve noises. Experience indicated that this has occurred when used with some engines but not with others. It involves the air flow pulsations set up in the intake manifold, particularly at certain engine speeds, and has been more noticeable with engines having fewer cylinders, e.g., four, than those with more cylinders, e.g., eight. It also appears to depend on other factors and conditions where such pulsations may sympathetically reinforce each other and operate at frequencies to which the valve member responds. While not being an adverse operational problem, the noises generated by the valve pulsations are objectionable.

As disclosed and claimed in certain of the other noted patents and applications, a side-load bias has been found to be helpful in preventing the valve from being excited by the engine air flow pulsations so that it also pulses.

In other instances, it is considered preferable to use no such side loading, but still provide means which will obviate the occurrence of undesirable pulsations of that type. One concept has been to increase the flexibility of the disc and seal member at some point or annular area between the center of the disc and the valve member bead. This arrangement is the subject of the Application Ser. No. 277,629 noted above and filed on even date herewith.

This invention is directed to another arrangement for obviating the occurrence of undesirable valve pulsations. This is accomplished by controlling the air flow during the process of valve opening and closing movements. The air flow is initially restricted as the opening movement begins, and directional air vent discharge is used to provide some side loading of the valve during the opening process, the directional discharge being substantially eliminated shortly before the valve reaches its fully open position. Therefore it is an object of the invention herein disclosed and claimed to inhibit undesirable valve pulsations and therefore inhibit the generation of undesirable valve noises which are the result of such pulsations by directing controlled air flow around the valve member during valve opening and closing movements without pulsingly opening and closing the valve. It is another object of the invention to provide a method for eliminating such pulsations.

The improvement over the earlier noted vacuum check valve assemblies is found in the provision of the air flow control ring 82. Ring 82 is illustrated as being formed as an integral part of housing section 26. However, as shown in FIG. 1a, it may be a separate ring 182 which is fitted tightly in the housing 26 immediately above the plane of the valve seat 44 so as to provide the desired contour located generally radially outward of the valve member seal when the valve is in the normal closed position. The use of a separate ring has advantages in that a series of rings may be available with slightly different axial and internal dimensions so that a ring may be selected to yield the best characteristics for any particular installation. This permits the manufacture of a single valve assembly, with only the ring being selectively provided for best performance. The following description, referring to ring 82, also fully applies to ring 182.

Ring 82 has an inner annular surface 84 which is radially spaced outwardly of the outer peripheral surface 86 of valve member seal 64 when the valve is in the closed position. This radial spacing is less than is the spacing between the valve member seal outer periphery and the side wall 88 of the portion of housing 24 defining the side wall of valve chamber outlet section 78 when the valve is open. The inner peripheral edge 90 of the ring 82 which is axially furtherest away from valve seat surface 44 is located so that the valve member seal 64, and therefore the entire poppet valve member 52, must move axially away from surface 44 for a predetermined distance to fully open the valve. This predetermined distance is substantially less than the maximum available axial travel of the poppet in the opening direction of movement, but is sufficient so that there is a restrictive air flow when the valve initially opens, with the result that the air flow occurs at a discharge point which is preferably at the outlet opening 36, as schematically shown in FIG. 3. In order to encourage this directional discharge point, the upper inner edge 90 of ring 82 in the immediate vicinity of outlet opening 36, or any other desirable circumferential location, may be slightly closer to surface 44 than is the remainder of ring inner edge 90, as shown in FIG. 1b as item 91. As the valve member seal 64 moves further away from surface 44, the outer periphery 86 of the valve member seal clears the ring inner peripheral edge 90, and in the process additional air flow is permitted around the edge 90, resulting in additional air flow discharge over a wider circumferential area, but still somewhat directional, as schematically shown in FIG. 4. As the valve moves into the fully open position, the seal periphery 86 becomes axially and radially clear of the ring upper edge 90, permitting substantially full unrestricted air flow from the inlet opening 32 to the outlet opening 36 past the poppet 52. This flow is schematically illustrated in FIG. 5.

So long as there is directional side air flow as shown in FIGS. 3 and 4, there is a venturi-like decrease in air pressure on the side of the poppet where the directional flow is taking place, with a slight lateral unbalance of air pressure forces acting on the poppet, side loading the poppet toward the direction of the directed air flow. Since this is preferably in the direction of the outlet opening 36, there is a slight lateral bias urging the poppet toward the outlet opening 36. This bias is greatest at the initial part of the valve opening process, and decreases as the full flow around the poppet comes into play. Thus the poppet is side loaded when it is most desirable to prevent the undesirable pulsations, but the side loading decreases and then disappears as the poppet moves to the fully open position. Since the valve is then open and not pulsing open and closed, this is advantageous in that the bias is not needed and the valve has no drag which will slow it down as it begins its movement to the closed position, increasing the valve sensitivity to changing pressure conditions without being subject to undesirable pulsations.

The illustrated and claimed invention provides an arrangement and method which effectively inhibit valve pulsations when they are likely to occur because of pressure differential changes at either the inlet or outlet port or both, and therefore inhibit undesirable valve noises generated as a result of such pulsations.

The embodiments of the invention in which an exclusive property or privilege is claimed are defined as follows:

1. In a vacuum check valve assembly for a vacuum powered brake booster having:
   a housing having a valve chamber formed therein, an inlet opening adapted to be connected to a vacuum powered brake booster, an outlet opening adapted to be connected to a source of vacuum pressure;
   and a check valve in said valve chamber having a normal closed position preventing vacuum communication between said outlet opening and said inlet opening and an open position permitting vacuum communication between said outlet opening and said inlet opening;
   said check valve having an axially guided disc including a disc body having a center and an annular rubberlike valve portion on the outer peripheral part of said disc body which sealingly engages said housing when said valve is in the normal closed position and is spaced from said housing to permit air to flow therepast when said valve is in the open position;
   the improvement comprising; an air flow control ring positioned radially outward of at least an axially extending part of the outer periphery of said rubberlike valve portion and extending from the housing surface sealingly engaged by said annular rubberlike valve portion when said valve in the normal closed position so that restricted air flow between said ring and said valve portion outer periphery occurs as said disc body and said valve portion move in the valve opening direction for a predetermined initial distance, said ring axially terminating so that substantially unrestricted air flow is permitted between said housing and said valve portion as said valve approaches the fully open position; said ring and said valve portion permitting radially directed increased air flow therebetween primarily at a selected circumferential location of said ring and said valve portion during the valve initial opening stages, said radially directed air flow circumferential location expanding circumferentially and the directed air flow therefore decreasing relative to the air flow around the other circumferential locations of said valve portion toward said outlet as the air flow becomes less restricted with additional valve opening movement until substantially unrestricted air flow occurs, said directed air flow then being substantially dissipated, said restrictive air flow during the initial valve opening stages inhibiting valve pulsations which may otherwise occur as the vacuum source air pulsation cycling frequency and force tends to excite said valve in a pulsating manner.

2. The invention of claim 1 in which said ring has a circumferential location near said outlet opening which is slightly axially closer to said housing surface engageable by said valve portion when said valve is closed, so that said radially directed air flow is caused to initially occur at that circumferential location.

3. The invention of claim 1 in which said radially directed air flow causes a side load reaction on said valve tending to damp out valve axial pulsations.

4. The invention of claim 1 in which said ring is an integrally formed part of said housing.

5. The invention of claim 1 in which said ring is a separately inserted element secured in said valve housing and is a selected one of a series of rings selected to provide the desired air flow characteristics for a particular installation.

6. The method of controlling undesirable valve pulsations and noises generated thereby in a check valve assembly when the valve member thereof may otherwise be excited by fluid flow pulsations generated in the fluid pressure source connected to one side of the check valve assembly, said method comprising the steps of:
  (a) providing a check valve including a valve member which is normally closed and opens when the absolute pressure on one side thereof exceeds the absolute pressure on the other side thereof by a predetermined value, the check valve being exposed to fluid flow pulsations from a fluid pressure source;
  (b) in the first stage of valve opening movement from the closed valve posiion and the last stage of valve closing movement from the open valve position providing a flow restriction around the valve member which dampens the movements of the valve member in the axial opening and closing directions;
  (c) and causing a radially directed fluid flow discharge from around the valve member initially only in a selected circumferentially located position during the first stage of valve opening movement and during the last stage of valve closing movement, generating a side load force on the valve member which disappears while the valve member is in and near its fully open position.

7. The method of claim 6, further comprising the step of increasing the circumferentially located position circumferential extent during valve opening to decrease the side load effectiveness in accordance with the amount of valve opening, and decreasing the circumferentially located position circumferential extent during valve closing to increase the side load effectiveness in accordance with the amount of valve closing.

* * * * *